United States Patent Office 3,120,451
Patented Feb. 4, 1964

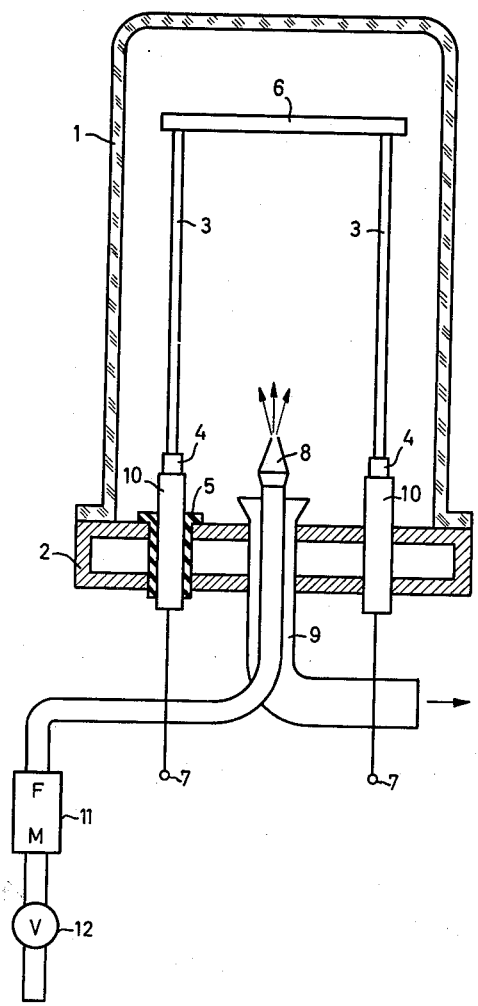

3,120,451
PYROLYTIC METHOD FOR PRECIPITATING
SILICON SEMICONDUCTOR MATERIAL
Otto Schmidt, Erlangen, and Erhard Sirtl, Munich, Germany, assignors to Siemens-Schuckertwerke Aktiengesellschaft, Berlin-Siemensstadt, Germany, a corporation of Germany
Filed May 24, 1961, Ser. No. 112,434
Claims priority, application Germany June 3, 1960
2 Claims. (Cl. 117—106)

Our invention relates to the pyrolytic production of semiconductor material. According to this method, the semiconductor material is precipitated from a flow of a gaseous halogen-containing compound of the semiconductor material to be produced, in mixture with a gaseous reaction agent, the precipitation being effected by exposing a heated body of the same semiconductor material to the gaseous mixture with the effect of reducing the semiconductor material from the gaseous compound thereof and depositing it upon the body.

According to a known method of this kind, two rod-shaped carriers of silicon are mounted at one end and have the other ends conductively connected with each other, the two mounted ends of the respective rods being connected to an electric current source so that the rods are heated to pyrolytic temperature by the passage of current therethrough. The other ends of the two rods may directly touch each other or they may be electrically connected with each other by abridge piece of high-purity graphite, particularly spectral carbon, or high purity silicon. While the carrier rods are electrically heated, a current of gas is being passed through the reaction vessel, consisting, for example, of a mixture of hydrogen with silicon tetrachloride or silicochloroform. The silicon compound is reduced at the heated carrier rods and the evolving hyperpure silicon is precipitated thereupon. In accordance with the gradual thickening of the rods by the growing amount of silicon, the electric current must be kept regulated in order to maintain the processing temperature at the value most favorable for the pyrolytic precipitation.

With increasing temperature of the silicon carrier bodies, the yield of semiconductor material at first also increases, but this yield again declines when a temperature maximum is reached. For a gas mixture of silicochloroform ($SiHCl_3$) and hydrogen ($H_2$) the most favorable temperature with respect to yield and economy of the process is at about 1,150° C. The process may be performed, for example, by operating with a considerable hydrogen excess (about 1 mole of $SiHCl_3$ per 20 mole $H_2$) and with a throughput of 2 m.³ reaction mixture per hour, using as carrier onto which the silicon is to be precipitated, two silicon rods of 20 to 100 cm. total length and an initial diameter of 2 to 6 mm. The reaction which takes place, through some intermediate stages, is substantially in accordance with the equation $$SiHCl_3 + H_2 = Si + 3HCl \qquad (1)$$

According to the law of mass action, the course of the reaction in the desired direction is promoted by increasing the hydrogen proportion of the mixture. When using other starting materials for precipitation of the semiconductor material, for example $SiCl_4$, $SiH_2Cl_2$, $SiH_3Cl$, $SiBr_4$ and the corresponding compounds of germanium, the respective reactions take place analogously. Also silicon carbide may be prepared using a mixture of silicon chloroform, chloroform and hydrogen or a mixture of methyltrichlorosilane and hydrogen.

Our invention relates to pyrolytic processes for the production of semiconductor material, generally of the above-mentioned type, and has as an object the improvement of the semiconductor products by further increasing their purity.

Another, more specific object is to reduce the amount of residual boron in the semiconductor products.

The drawing illustrates apparatus for the pyrolytic precipitation.

The drawing is herewith described in greater detail. The reaction vessel of the apparatus consists of a quartz bell 1. The bell is closed, and gas-tightly sealed, by means of a mounting head 2. Secured to the mounting head 2 by means of suitable holding devices 4 are the carrier rods 3 consisting of hyperpure silicon. The mounting head 2 may consist of silver coated brass, for example. The two holders 4 pass through the mounting head, and at least one of them, has electrical insulating means 5 between it and the mounting head. The holders are in metal sleeves 10 which are electrically connected to two current supply terminals 7 outside of the bell. The upper ends of the carrier rods 3 are connected by an electrically conducting bridge member 6 of graphite or silicon. A nozzle 8 for the supply of the gas mixture and an outlet duct 9 are likewise inserted through the mounting head 2 into the reaction space within the bell. The rate of entry of the incoming gas mixture is measured by flow meter 11 of conventional design and controlled by valve 17, particularly a needle valve.

To achieve these objects, and in accordance with our invention, the production of semiconductor material is basically effected in the above-described manner, namely by precipitating it from a flow of a gaseous mixture of a halogen containing compound of the semiconductor material and a gaseous reducing carrier gas, e.g. hydrogen, onto a heated body of the same semiconductor material within a processing vessel and while operating with a given throughput, i.e. a given volumetric flow quantity per unit of time, of the gas mixture passing through the reaction vessel. However, according to our invention, the throughput of gas mixture through the vessel is varied during the course of the process, namely so that the pyrolytic precipitation is initially performed with a smaller throughput of the flowing mixture, and this throughput is thereafter gradually increased to the normal, rated value. As a result, the number of lattice defects in the precipitated semiconductor material is greatly reduced.

The purity of the semiconductor material produced by pyrolytic precipitation depends to a great extent upon the purity of the starting materials used, mainly upon the carrier rods, the halogen containing semiconductor material, and the reducing gas. By subjecting the pyrolytically finished products to subsequent crucible-free (floating) zone melting in vacuum, the rod-shaped semiconductor product can be further purified. The zone melting treatment causes a portion of the impurities to migrate to the ends of the semiconductor rod and another portion of the impurities to evaporate into the vacuum. In this manner, a semiconductor material of the extreme purity required for electronic purposes, can ultimately be obtained.

Boron has the detrimental property that it cannot be appreciably displaced in the carrier rod by zone melting because the distribution coefficient of boron is near unity and that it evaporates into the vacuum only to a very slight extent. It is therefore desirable to minimize any quantity of boron that may enter into the semiconductor material when producing the material by the above-described pyrolytic method. As mentioned, it is a specific object of the present invention to achieve a further improvement in this respect.

As a rule, boron is contained in the reaction gas mixture in the form of boron trichloride ($BCl_3$). Simultaneously with the above-described reaction resulting in precipitation of semiconductor material, there occurs a similar reaction which results in the precipitation of boron and corresponds to the formula:

$$2BCl_3 + 3H_2 = 2B + 6HCl \qquad (2)$$

It has been found, in the performance of the pyrolytic method, that the just-mentioned second reaction does not take place if the concentration of boron in the reaction gas mixture is kept below a given value. In the above-described process operating with silicochloroform and hydrogen, this threshold value is below 10 μgram boron per gram silicon contained in the reaction gas mixture. The hydrogen chloride gas, evolving in the reaction according to the Formula 1, represents, such a great excess in the Formula 2 that the reaction according to the Formula 2, due to the law of mass action does not, practically, proceed from the left toward the right of the formula, thereby preventing the above mentioned threshold value from being reached.

The materials used, before being introduced into the pyrolytic process, are extensively pre-purified, so that their boron content is below the above-mentioned value. Consequently, while the precipitation process is progressing under normal conditions, there is virtually no precipitation of boron.

The operating conditions at the beginning of the process differ, however, because when the reaction gas mixture is first passed into the reaction space, no hydrogen chloride is present. Consequently, boron is precipitated until the quantity of the evolving hydrogen chloride becomes sufficient to prevent the reaction of Formula 2 from proceeding from the left toward the right of the equation.

If, however, according to the invention, the throughput of the reaction-gas mixture is considerably reduced, for example, down to one-tenth of the volume normally passing into the processing vessel, during the initial processing interval, then the quantity of boron precipitated upon the carrier is correspondingly reduced. After a sufficient quantity of hydrogen chloride has been developed in the processing vessel, the throughput can be gradually increased so that an excess of hydrogen chloride remains preserved.

Thus, in the above-described example, if the throughput during normal operation is 2 m.$^3$ reaction gas mixture per hour, then it suffices according to the invention to commence the pyrolytic process (the carrier bodies of semiconductor material being heated to incandescent temperature) by initially operating with a gas throughput of approximately 0.2 m.$^3$ and to gradually increase the throughput in about 5 to 15 minutes up to the normal value just mentioned.

We claim:

1. In a pyrolytic method for precipitating silicon from a flowing mixture of silicochloroform and hydrogen onto a body of semiconductor silicon, heated to incandescent temperature in a vessel, the improvement which comprises regulating the boron impurity present in the reaction gas mixture below 10 micrograms per gram of silicon in the reaction gas mixture by initially operating at a throughput of about 0.2 mm.$^3$ per hour and gradually increasing the throughput in about 5 to 15 minutes to about 2 mm.$^3$ per hour.

2. In a pyrolytic method for precipitating silicon semiconductor material from a flowing mixture of a gaseous halogen-containing compound of the semiconductor material and hydrogen, onto a body of said silicon semiconductor material heated to incandescent temperature, within a vessel, the improvement which comprises regulating the boron impurity present in said reaction gas mixture to a value below the threshold value for boron precipitation, by initially operating said pyrolytic precipitation at a first throughput rate and thereafter increasing the throughput to a second throughput rate about ten times said first throughput rate over a period of about five to about fifteen minutes, said second throughput rate being that used for normal operation of the pyrolytic precipitation process, thereby initially preventing boron from precipitating on the semiconductor body.

References Cited in the file of this patent

UNITED STATES PATENTS

| | | |
|---|---|---|
| 2,981,605 | Rummel | Apr. 25, 1961 |
| 2,993,762 | Sterling et al. | July 25, 1961 |
| 2,999,735 | Reuschel | Sept. 12, 1961 |